W. BALL.
Ore Amalgamator.
BEST AVAILABLE COPY
No. 274.
Reissued Aug. 8, 1854.
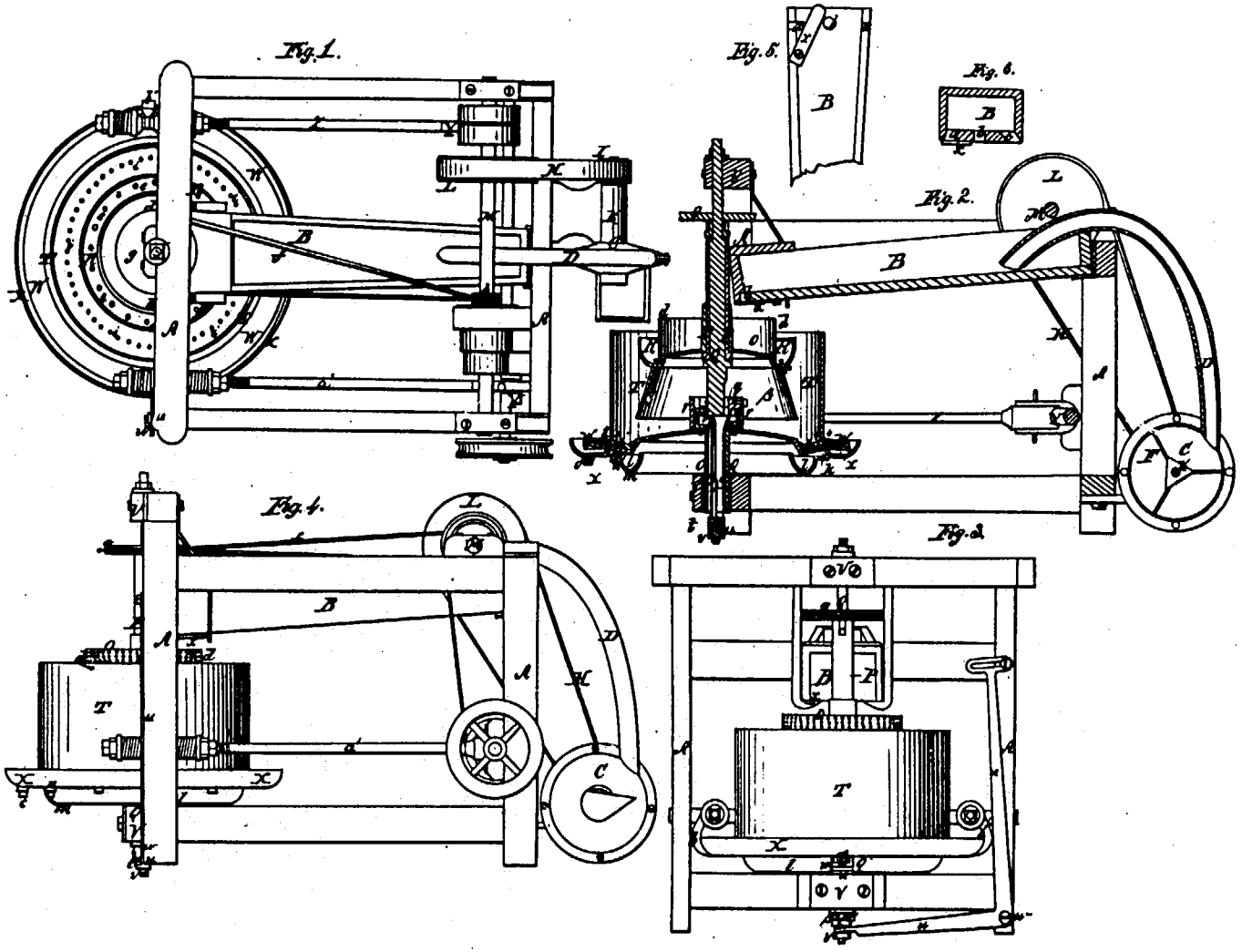
Witnesses:
Inventor:
AM. PHOTO-LITHO. CO. N.Y. (OSBORNE'S PROCESS.)

BEST AVAILABLE COPY

BEST AVAILABLE COPY

UNITED STATES PATENT OFFICE.

WILLIAM BALL, OF CHICOPEE, MASSACHUSETTS.

GOLD-AMALGAMATOR.

Specification forming part of Letters Patent No. 8,344, dated September 9, 1851; Reissue No. 224, dated August 8, 1854.

*To all whom it may concern:*

Be it known that I, WILLIAM BALL, of Chicopee, in the county of Hampden and State of Massachusetts, have invented a new and useful Improvement in Mechanism for Separating Gold from the Ore by Amalgamation; and I do hereby declare that the same is fully described and represented in the following specification and accompanying drawings, letters, figures, and references thereof.

Of the said drawings, Figure 1 denotes a top view of my improved machine. Fig. 2 is a central vertical and longitudinal section of it. Fig. 3 is an end elevation, and Fig. 4 a side elevation of the same.

In machines for separating gold from the ore by amalgamation, as hereinbefore arranged and constructed, the pulverized ore has been simply passed through the mercury, or, at most, the two have been agitated in contact with each other as the ore passed over the surface of the mercury.

The principal feature of my invention consists in confining the mercury between two metallic or other surfaces to which a vibratory motion is communicated, the pulverized ore being caused to pass between the upper plate and the mercury, by which means it is violently rubbed into the surface of the latter, and the gold is more thoroughly and expeditiously separated from the ore than when it is permitted to pass through or over the surface of the mercury in the ordinary way, for in the latter case the smaller particles of gold, being protected by the stream of water which incases them and by which they are carried along, may not be brought into actual contact with the mercury, and may thus pass off with the water and waste sand; but by rubbing the gold between the mercury and the plates, as above stated, every particle of it is effectually brought into contact with the mercury, and a great saving of gold is the result.

To enable others skilled in the art to make and use my invention, I will proceed to describe the method which I have adopted of carrying it out.

In the said drawings, A represents the framework for supporting the operative parts of the machine. B is a spout or conducting-trough, which is made to receive a current of washed gravel, auriferous ore, and water, either from a washing apparatus or a stamp-mill.

In my machine it is customary for me to employ a fan pump or blower to elevate such stream of ore and water into said trough, so as to enable me to use the amalgamating apparatus on the same floor or level with the washing apparatus. The outer casing of such pump is represented at C in the drawings, the conducting pipe therefrom being seen at D as extending upward and discharging directly into the trough before described. Within this casing a fan-wheel, F, like that of an ordinary fan-blower or blast apparatus, is placed, and made to rotate with sufficient velocity to elevate the liquid which is received through the center of its case. The said fan-wheel is rotated by means of an endless band, H, which not only passes around the pulley I on the shaft K of the said fan-wheel, but also around a driving-pulley, L, fixed on a driving-shaft, M. This fan-wheel pump apparatus, however, forms no part of my invention, but it is only a matter of convenience, to enable me to use said invention on the same floor with other machinery, as specified.

Fig. 5 represents a view of the lower side of the discharging end of the receiving-trough B, while Fig. 6 is a transverse section of the same. The water, in passsing out of said trough, is discharged through three orifices, *a b c*, the two outer ones having such an inclination given to them as will cause the water to be thrown directly against the vertical perforated side *d d* of the upper revolving and distributing reservoir or vessel, O, which vessel or reservoir is fixed upon a vertical tubular shaft, P, which works upon and around the main vertical shaft Q of the machine. The reservoir or vessel O has its sides perforated with holes, and is surrounded by a concentric channel, R R, whose upper edge is arranged somewhat below the upper edge of the vessel O, as seen in the drawings, and whose bottom is punctured with a series of holes, *e e*, &c. This vessel is put in rapid revolution by means of an endless belt, *f*, which works around a pulley, *g*, on its shaft, and another pulley, *h*, on the main driving-shaft.

From the under side of the trough R, and within the circle of its discharging-holes *e e*,

BEST AVAILABLE COPY

I extend downward in manner as shown in the drawings a flange-partition or hollow conic frustum, S, which is intended to dip into the water contained in the lower vibrating distributing-reservoir, to be hereinafter described. The said reservoir consists of a circular vessel or receiver, T, which is affixed to the vertical shaft Q, supported in bearings, as seen at U V. The bottom of this reservoir T declines toward a series of holes made through it and in the circumference of a circle concentric with the sides of the vessel, two of such holes being seen at *i i* in Fig. 2, which figure also exhibits the manner in which the bottom of said vessel declines toward such holes. The said series of holes, arranged in a circle, open into a mercury bath, W W, (colored red in Fig. 2,) which extends underneath the holes and concentrically around the main shaft, and has its bottom made with an inclination upward, as seen in Fig. 2. Another and secondary mercury bath is shown at X X as placed under the bottom of the first-mentioned mercury bath and concentrically around the main shaft, and so that its bottom shall have an inclination upward in a direction opposite to that of the bottom of the first bath, the vertical section of said bath being represented by the drawings. This annular space may either be used as a secondary bath, for which purpose it may be supplied directly with mercury before the machine is started, or it may simply serve the purpose of a reservoir to receive and retain any mercury which may be thrown out of the bath W by carelessly operating the machine. The inner boundary of this secondary bath or reservoir is a small upright ledge or wall, *k*, over which the waste matter from the bath flows, and is received into a circular trough, *l l*, which extends concentrically around the main shaft and serves to conduct the waste to a single discharging-orifice, *m*, made through it. Each mercury bath is provided with a tap-screw or other proper contrivance, *n* or *o*, for drawing off its contents when necessary. The lower part of the main shaft Q is made hollow or tubular for some distance up from its bottom, and for a short distance just above the bottom of the vessel T the said shaft is increased in diameter or size, as seen at *p*, and is made to have several openings, *q*, made through it, so as to communicate with the interior of the vessel T, and to allow water thereon to flow down through such openings into the tubular part of the shaft and out at its lower end. A tubular gate or ferrule, *r*, is made to fit upon the large part *p* of the main shaft, and to rise and fall freely in a vertical direction thereon. It has three or any other suitable number of rods, *s s*, extended down from it and through any of the orifices made in the said enlarged part of the shaft. They also extend through the tubular part of the shaft, and are united at their lower ends to the head of a screw, *t*, as seen in the drawings. The said screw *t* passes through one end of a bent lever, *u*, and has a nut, *v*, screwed upon it. The said lever is arranged and has its fulcrum at *w*, as seen in the drawings. By turning the lever on its fulcrum the circular ferrule or gate may be raised or lowered as occasion may require.

I would remark that to one of the external or lateral orifices of discharge of the receiving spout B, I apply a sliding plate or gate, *x*, in such manner as to enable me to readily diminish said orifice in order to regulate the flowage of water out of it, and thus regulate the amount of water discharged into the reservoir O. The lower vessel, T, and the mercury bath attached to it are together to have a reciprocating or vibrating circular motion imparted to them, which motion may be produced by two bell-cranks, Y Y, fixed upon a secondary shaft and standing in opposite directions therefrom. To each of these cranks one end of a connecting-rod, *z* or *a'*, is jointed, the opposite end of said connecting-rod being suitably jointed to an ear, *b'*, extended from any suitable part of the vibrating vessel.

On the 19th day of June, 1849, Letters Patent of the United States No. 6,535 were granted to me for a new and useful machine for separating gold from the ore or extraneous matters by means of mercury and water. Such machine contained a vibrating mercury bath, which was arranged in the central part of the machine. In my present amalgamator the mercury bath is not arranged at the center of the machine, but at some distance therefrom, as already explained, and consists of a ring of mercury, which is confined between the plates $a^4$ and $y^2$. These plates are inclined upward and hold the mercury between them, as seen in Fig. 2. The operation of this part of the machine is peculiar, and may be described as follows: The pulverized ore and water, being forced through the apertures *i* in the bottom of the vessel T, rises immediately to the top of the mercury, into which it is rubbed by the vibrating plate $a^4$ until it escapes upon the surface of the mercury and from beneath the plate, and is carried over the edge of the plate $y^2$ into the secondary bath X beneath. The vibrations of the plates $a^4$ and $y^2$, which form the upper and lower walls of the mercury bath, are so short and rapid that no perceptible motion is communicated to the mercury, which remains very nearly stationary, and thus the rubbing action is produced. This rubbing of the ore into the mercury separates and detaches the gold from it more expeditiously and thoroughly than can be effected by the machines in which the ore is permitted simply to pass through the mercury or over its surface; and it is believed that this rubbing of the ore into the mercury has never before been attempted or accomplished. Besides this, by using the distribution-reservoir O and its ring R, to which a constant continued rotary motion is given, the mixture of liquid and ore is not only separated from chips and much other extraneous matters which are always more or less commingled with it, but it is discharged

BEST AVAILABLE COPY from the ring or trough R R in numerous jets or streams, whereby it is thrown and properly distributed into the water of the reservoir T T, and is equally distributed over its line or circle of discharging-orifices or those connecting the vessel T with the main mercury bath.

As it is desirable to maintain a head of water within the vessel T sufficient to cause the contents discharged through its bottom to pass through the ring of mercury in the mercury bath, I make use of the regulating ferrule or gate which was before described as applied to the center shaft of the said vessel T. As the surplus water is discharged over the top of said ferrule and down through the hollow shaft, it will be evident that by means of said ferrule we can regulate the depth of water within the vessel T, for by raising the ferrule we increase the depth in said vessel, and by lowering it we decrease the same.

By making stationary the spout or contrivance which conveys the water or discharges it in streams upon the screen of the distributer, and at the same time making such screen to rotate and to stand vertically, the ore is much better washed and separated from extraneous matters and the perforations of the screen are much less liable to be choked than when the screen (arranged horizontally) and the contrivance which discharges water upon it are simultaneously moved together with a short vibratory movement, such being the arrangement and operation of the parts in my machine as heretofore patented.

What I claim, therefore, as my invention is as follows:

1. The combination of the partition S (dipping below the surface of the water) with the lower distributer provided at the center with a discharge-aperture for the water and light particles, and at the periphery with apertures for the discharge of the water and heavier particles, for the purpose of preventing the escape of gold over the central or waste pipe.

2. The arrangement of the sliding-tube ferrule or waste-gate directly upon the hollow axle of the lower distributer T, the same being for the purpose of regulating the head of water within the said distributer.

I am aware that it is not unusual in gold-washers to use a succession of baths. Therefore I do not claim such arrangement in general; but I claim—

3. Arranging the secondary mercury bath concentric with and below the primary one in such a manner that the current of water, &c., return toward the center of the apparatus, thereby saving room and causing said currents to pass more slowly.

4. Rubbing the pulverized ore into the mercury in the manner and for the purpose substantially as described.

In testimony whereof I have hereunto set my signature this 10th day of June, 1854.

WM. BALL.

Witnesses:
SAM. COOPER,
JOHN S. CLOW.